United States Patent [19]

Sato

[11] 4,423,110
[45] Dec. 27, 1983

[54] PROCESS FOR FORMING OPEN CELL SHEET, SHEET FORMED BY PROCESS, INTERMEDIATE FOR FORMING SAID SHEET AND PROCESS FOR FORMING SAID INTERMEDIATE

[75] Inventor: Akira Sato, Tsuchiura, Japan

[73] Assignee: Lonseal Kogyo Co., Ltd., Tokyo, Japan

[21] Appl. No.: 134,535

[22] Filed: Mar. 27, 1980

[30] Foreign Application Priority Data

Mar. 27, 1979 [JP] Japan .................................. 54-36509

[51] Int. Cl.³ ........................ B29D 27/00; B32B 5/18
[52] U.S. Cl. .................................... 428/304.4; 264/9; 264/54; 264/117; 264/DIG. 13; 264/DIG. 60; 521/73; 521/93; 524/394; 524/399; 524/400
[58] Field of Search ........ 264/54, DIG. 60, DIG. 13, 264/117, 9; 521/73, 93; 524/394, 399, 400; 428/304.4

[56] References Cited

U.S. PATENT DOCUMENTS

| | | | |
|---|---|---|---|
| 2,666,036 | 1/1954 | Schmencke ................. | 264/DIG. 60 |
| 2,875,088 | 2/1959 | Stiehl et al. ................. | 264/54 X |
| 2,894,855 | 7/1959 | Wilhelm et al. ............. | 264/54 X |
| 2,964,799 | 12/1960 | Roggi et al. ................. | 264/54 X |
| 3,173,978 | 3/1965 | Olson et al. ................. | 264/DIG. 60 |
| 3,192,294 | 6/1965 | Streed et al. ................ | 264/54 |
| 3,265,785 | 8/1966 | Rainer ......................... | 264/54 X |
| 3,266,966 | 8/1966 | Patchell ....................... | 264/54 X |
| 3,376,366 | 4/1968 | Clark ........................... | 264/54 X |
| 3,586,654 | 6/1971 | Lerman et al. ............... | 264/9 X |
| 4,059,661 | 11/1977 | Eck et al. .................... | 264/54 |
| 4,079,107 | 3/1978 | Brunner et al. ............. | 264/DIG. 60 |
| 4,226,943 | 10/1980 | Tsurushige et al. .......... | 521/73 |
| 4,237,239 | 12/1980 | Lilley .......................... | 521/73 X |

FOREIGN PATENT DOCUMENTS 1195867 6/1970 United Kingdom ....... 264/DIG. 60

OTHER PUBLICATIONS

Penn, W. S. "PVC Technology" Third Edition, New York, Wiley Interscience, ©1971, pp. 265-275.
"Vinyl Chloride Processing," vol. 1, published by Nippon Zeon Co., Ltd., Jun. 1, 1968, pp. 246-247, 252-254 and 414 (translation).

Primary Examiner—Philip E. Anderson
Attorney, Agent, or Firm—Sandler & Greenblum

[57] ABSTRACT

A process for producing an open cell foam. The process comprises mixing a polyvinyl chloride composition, plasticizer, at least one stabilizer, and a foaming agent to form a blend; gelling the blend; forming the gelled blend into a sheet; and heating the sheet to decompose the foaming agent thereby forming the open cell foam. The sheet formed by the process. The process for forming an intermediate used in the process and the intermediate itself.

22 Claims, 1 Drawing Figure

PROCESS FOR FORMING OPEN CELL SHEET, SHEET FORMED BY PROCESS, INTERMEDIATE FOR FORMING SAID SHEET AND PROCESS FOR FORMING SAID INTERMEDIATE

BACKGROUND OF THE INVENTION

1. Field of the Invention

This invention relates to a novel process for producing an open-cell foam of plasticized polyvinyl chloride having outstanding water permeability and breathability.

2. Description of Prior Art

Cellular bodies of plasticized polyvinyl chloride are usually of closed-cell structure and lack water permeability and breathability, unlike polyurethane foams.

An open-cell foam can be produced from plastisol PVC by use of "Vinyfoam AZ-F" (Ohtsuka Chemicals and Drugs Co., Ltd.)—a blowing agent specially developed for plastisol PVC or by use of azodicarbonamide and waseline or paraffin in combination. However, it has been impossible to produce open-cell foams from plastisol PVC by use of a commonly employed blowing agent such as azodicarbonamide alone.

The processing of plastisol is normally performed in the liquid phase, and the production of a foam from plastisol is carried out by a coating method which is not suitable for continuous and volume production. A process for producing open-cell foams by calendering has been in demand, however, no such process has as yet been developed.

SUMMARY OF THE INVENTION

It is an object of this invention to provide a process for producing open-cell foam. According to the process of this invention, polyvinyl chloride for use as plastisol produced by emulsion polymerization or bulk polymerization is blended with plasticizer, stabilizers, blowing agent, and other additives. The stabilizers used in this invention include, in combination, an organic stabilizer containing a metal of Group I of the Periodic Table and an organic stabilizer containing zinc and an other metal, the two stabilizers being used in combination. The blowing agent used in this invention is a heat-decomposable chemical blowing agent powder such as azodicarbonamide, which is commonly employed for the production of closed-cell foams. Such additives as fillers and pigments are incorporated as required. The blend thus prepared is processed into a sheet by calendering or extrusion, and the sheet is ultimately heated to a temperature at which the blowing agent decomposes.

When added distinctly, one of the organic stabilizers contains at least one Group I metal, e.g., Na, K, Li, etc. alone or in combination, while another contains zinc alone or zinc and an other metal such as calcium in combination. These two stabilizers may be added separately or in the form of a single composite form in which the metal components are caused to coexist by coprecipitation or other appropriate means.

DESCRIPTION OF THE PREFERRED EMBODIMENTS

Figure 1:
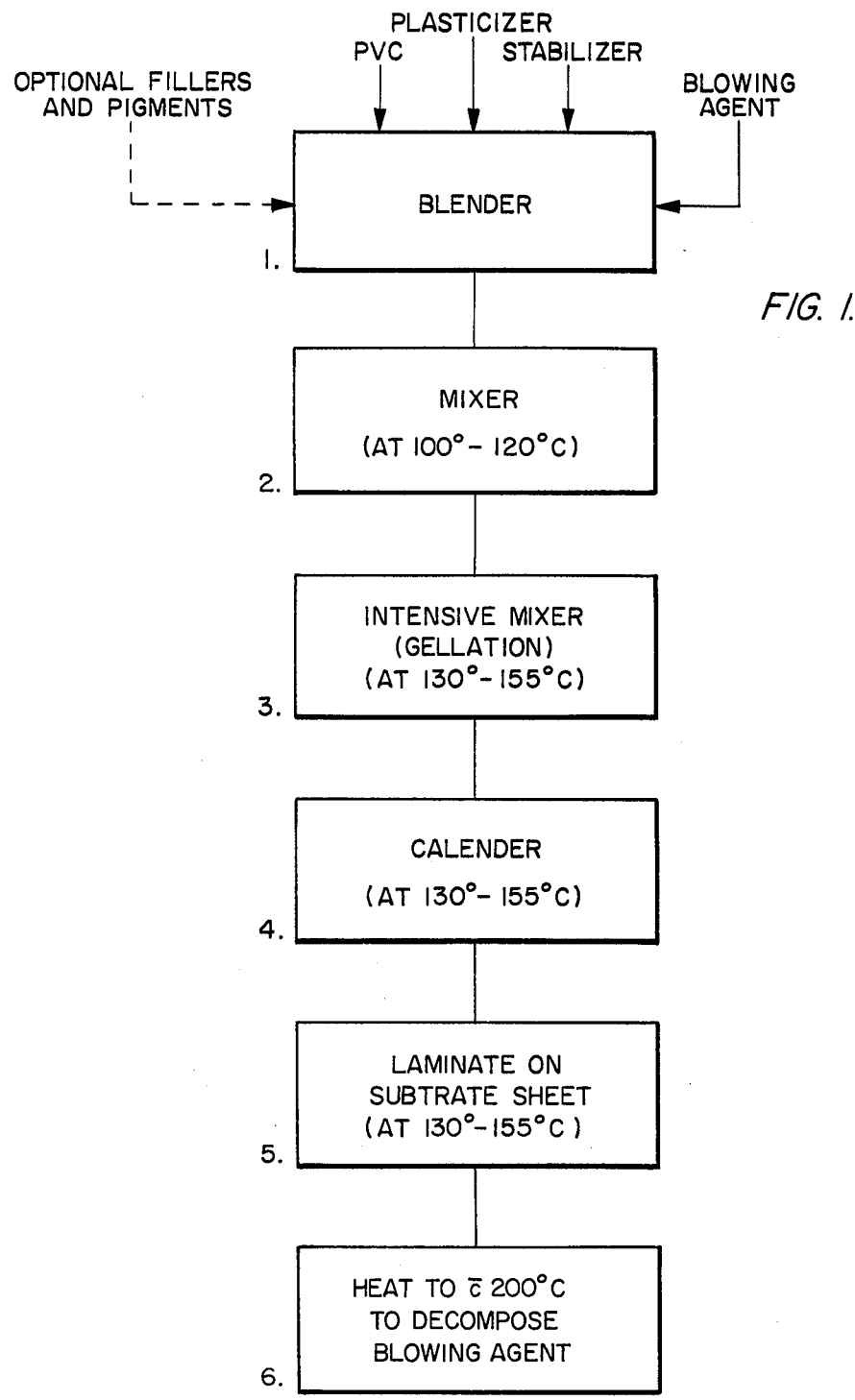
FIG. 1 is a flow sheet illustrating a preferred embodiment of the invention.

Plastisol PVC prepared by emulsion polymerization or bulk polymerization can be employed for the process of this invention. However, general purpose PVC such as "Geon #121", Geon #135J", and "Geon #131A" made by The Japanese Geon Co., Ltd. and "Sumilit PX-NL" made by Sumitomo Chemical Co., Ltd. is not necessarily suitable for the process of this invention because they give foams of poor water permeability and breathability. Open-cell foams having outstanding water permeability and breathability can be produced from plastisol PVC available under the trade name of "Geon #22", "Geon #25", and "Geon #27" made by The Japanese Geon Co., Ltd., "Kaneka PSL-31" made by Kanegafuchi Chemical Industry Co., Ltd. and "#7012" made by Hüles of West Germany.

The polyvinyl chloride that can be used in this invention is not limited to PVC homopolymer, but includes PVC copolymers and blends of PVC homopolymer and copolymers. Such PVC copolymers include vinyl chloride-acetate copolymer, vinyl chloride-ethylene copolymer, and vinyl chloride-maleic acid copolymer. Best results can be obtained with vinyl chloride-acetate copolymer alone or in combination with PVC homopolymer. Thus, the term "polyvinyl chloride" as used in this specification is taken to include PVC homopolymer, copolymers, and blends thereof, and is not limited to vinyl homopolymer alone. In addition, it is within the scope of this invention to blend polymethyl methacrylate, ethylene-vinyl acetate copolymer, acrylonitrile-butadiene rubber, and other polymers for modification of PVC homopolymer. Such blends are also included in the term "polyvinyl chloride".

The polyvinyl chloride suitable for the process of this invention should have a polymerization degree (D.P.) from 400 to 1300, preferably from 600 to 1000. As with general flexible PVC foams, the polymerization degree is limited to the above range if a satisfactory foam is to be made by use of a blowing agent incorporated into the composition. However, the range should not be construed as a limitation of this invention since better results are obtained with respect to calendering performance and foam properties when PVC resins having polymerization degrees of 400 and 1350 are mixed at a 1:1 ratio than when PVC resin having polymerization degree of 800 is used alone.

The stabilizer, and particularly the kind of metal component contained in the stabilizer, plays an important part in the process of this invention. Two kinds of metals are contained separately in two stabilizers or contained together in one stabilizer. When used separately, one organic stabilizer contains metals of Group I of the Periodic Table, such as Na, K, Li, etc. alone or in combination, while another organic stabilizer contains zinc alone or zinc and an other metal such as calcium in combination. These two stabilizers may be added individually or in the composite form in which the metal components are caused to coexist by coprecipitation or other appropriate means. The first group of separate stabilizers are exemplified by sodium octoate, potassium octoate, sodium stearate, potassium stearate, zinc stearate, and calcium stearate, which are all individual compounds. The group of stabilizers of composite form include "Mark FL-22" containing Na together with Zn and Ca (made by Adeca Argus), "Mark FL-23" containing Na and Zn (made by Adeca Argus), "KF-65E-6" containing K and Zn (made by Kyodo Pharmaceuticals), "KF-80A-8" containing K and Zn (made by Kyodo Pharmaceuticals), and "Stabilizer F" containing Na and Zn (made by Otsuka Chemicals). The composite stabilizers further include "Mark FL-21, FL-25, and FL-26". (Adeca Argus)

The above composite stabilizers have been developed for paste PVC resins which are used for the production of closed-cell sponge sheets. A special blowing or foaming agent such as "Vinyfoam AZ-F" as mentioned above has been found indispensable for the production of open-cell foams.

In contrast with the composite stabilizers as mentioned above, those stabilizers which do not contain Group I metals are not suitable for the process of this invention. Such stabilizers include "Mark OF-15" (stabilizer for foaming by calendering, containing Zn and Ba), "Mark 189E" (containing Ba and Cd) both made by Adeca Argus, "S-8G" (containing Ba, Zn, Mg and Cd made by Toa Rika Kogyosho, and "ABC-1J" and "ABC-1GJ" (containing Zn) made by Eishin Kasei K.K. These stabilizers result in foams having no water permeability and breathability at all, even when used in combination with "Geon #22 or #27" which are otherwise suitable.

It is one feature of this invention that the above-mentioned resin and stabilizer can be combined with a heat-decomposable chemical blowing agent powder such as azodicarbonamide which is commonly used for the production of closed-cell foams. This provides the advantage that no special equipment (to mix paste with air) is required, no special blowing agent (e.g., AZ-F made by Otsuka Chemicals) is required, addition of waseline having deleterious effects is eliminated, and calendering is possible for volume production.

The composition for the process of this invention may be blended with fillers such as calcium carbonate, silica, and talc, flame retardants such as antimony trioxide and alumina trihydrate, antioxidants, UV light absorbers, pigments, and other additives as required.

The blend containing all the necessary components is a paste of high viscosity. It is converted into granules or powder when mixed at an elevated temperature of 100 to 120° C. in a Henschel mixer or the like. The blend in granular or powdery form is easier to handle than the paste. This mixing step does not include the gelling step, or has nothing to do with the foaming performance of the blend.

Gelation of the mixed blend may usually be accomplished using an intensive mixer. An intensive mixer of drop door type which is tightly sealed is suitable for pasty blends, while an intensive mixer of the slide-door type is preferable for granular blends. Care should be taken to avoid overheating in the gelling process. The same care should be exercised in roll mixing and calendering. The blend for the process of this invention is sensitive to heat and should be processed at temperatures from 130° C. to 155° C. Except for this temperature condition, the gelling process and roll mixing process are carried out in the same manner as for normal processing.

The blend which has undergone the mixing and gelling processes is then calendered and laminated onto a substrate such as woven cloth, knitted fabric, paper, nonwoven fabric, and release paper depending on the application. Where an extruder is employed, the granular or powdery blend discharged from the Henschel or like mixer is fed to the extruder as such, or in the form of pellets after roll mixing and pelletization. The extruded sheet may be laminated to a substrate as in calendering. The laminate thus obtained is subsequently passed through an oven heated to about 200° C. to permit the PVC blend to be foamed. No special oven is required for the process of this invention. The resulting foamed sheet is of open-cell structure having outstanding water permeability and breathability. The foamed sheet emerging from the oven may undergo embossing to form a skin layer that reinforces the foam surface.

The open-cell foam obtained by the process of this invention has ten times as high breathability as needled leather having 20 to 50 holes per square centimeter formed by heated needles, and exhibits outstanding water permeability. The foam sheet produced according to the process of this invention absorbs water instantaneously when some waterdrops are placed thereon and permits water to penetrate the foam layer to the reverse side very easily.

By virtue of the above-mentioned features, a laminate of a substrate and the open-cell foam produced according to the process of this invention is useful as upholsteries for automotive seats and hairdresser's chairs. The laminate of the foam and paper is useful as wallpaper which is resistant to dew condensation due to heat insulation, moisture absorption, and water permeability of the foam. The laminate used as wallpaper has an additional advantage that textured patterns can be designed easily on the non-rigid thermoplastic resin foam. Where the laminate is used as upholstery surface treatment might be required to increase surface strength. Such surface treatment may be performed satisfactorily by applying the surface treating agent in a dotted pattern using a gravure coater so that the pores of the foam are not clogged completely.

The process of the invention will be more clearly understood with reference to the following examples.

EXAMPLES 1–22

Foam laminates were prepared in the following manner from various formulations as shown in Table 1a (for Examples 1–11) and Table 1b (for Examples 12–22). "Mark FL-23" used in Examples 1–11 was replaced by "Mark FL-22" in Examples 12–22.

The ingredients were mixed uniformly using a test mixer. The mixture was roll milled at 150° C. for 10 minutes and made into a 0.35 mm thick sheet, which was immediately laminated onto a substrate of spun rayon muslin No. 4. The laminate was heated and allowed to foam in an oven at 210° C. for 1.5 minutes. A 1.6 mm thick foamed laminate sheet was obtained. The foamed sheet underwent breathability and water permeability tests in accordance with the methods specified in the notes to Table 1. Test results are shown in the tables. The resulting products lack the desired breathability and permeability with the exception of the foams fo Examples 6–9 and 11, and Examples 17–19 and 22.

COMPARATIVE EXAMPLES 1–5

Examples 6–9 and 11 were repeated, except that the stabilizer "Mark FL-23" was replaced by "Mark OF-15". The resulting laminates lacked breathability and water permeability.

COMPARATIVE EXAMPLES 6–10

Comparative Examples 1–5 were repeated, except that "Mark OF-15" was replaced by "Mark 189E". The resulting laminates lacked breathability and water permeability.

COMPARATIVE EXAMPLES 11-15

Comparative Examples 1-5 were repeated, except that "Mark OF-15" was replaced by "Advastab C-8". The resulting laminates lacked breathability and water permeability.

COMPARATIVE EXAMPLES 16-20

Comparative Examples 1-5 were repeated, except that "Mark OF-15" was replaced by "Advastab ABC-1G". The resulting laminates lacked breathability and water permeability.

EXAMPLES 23-29

The process of Examples 1 to 22 was repeated, except that "Geon #27" polyvinyl chloride was employed which gave foams of high breathability in Examples 8 and 19, and that composite stabilizers containing Group I metal and zinc (Examples 23-25) and combinations of single compound organic stabilizers were employed (Examples 26-29). The formulation and test results are shown in Table 2.

As illustrated in Examples 1 to 29 and Comparative Examples 1-20, in accordance with the process of this invention, it is possible to produce open-cell foams having water and moisture permeability as well as breathability by calendering if appropriate stabilizers are selected. These properties cannot be obtained with "Mark OF-15", "Mark 189E", "Advastab S-8", and "Advastab ABC-1G" which are stabilizers not containing Group I metals; they give closed-cell foams. As shown in Examples, stabilizers containing Group I metals give open-cell foams (although breathability varies depending on polyvinyl chloride used). The process of this invention is highly significant in that open-cell foams can be produced by calendering or extrusion, rather than by the conventional paste method.

The foamed laminate emerging from the oven may be passed through an embosser to modify the surface properties of the foam. If a smooth embossing roll (not necessarily glossy roll) heated to 120°-150° C. is employed, the surface cell structure of the foam is destroyed and a scratch-resistant skin layer is formed. Surprisingly, however, the breathability and water permeability of the foam are only slightly affected such a skin layer.

Thus, according to the process of this invention, it is possible to produce a sponge leather which has a textured pattern like conventional sponge leathers and which exhibits breathability and water permeability not obtainable with conventional sponge leathers.

TABLE 1a

| Examples | 1 | 2 | 3 | 4 | 5 | 6 | 7 | 8 | 9 | 10 | 11 |
|---|---|---|---|---|---|---|---|---|---|---|---|
| Ingredients | | | | | | | | | | | |
| Plastisol PVC | | | | | | | | | | | |
| Geon #121 | 100 | | | | | | | | | | |
| Geon #135J | | 100 | | | | | | | | | |
| Geon #131A | | | 100 | | | | | | | | |
| Geon TS-12 | | | | 100 | | | | | | | |
| Geon 43B | | | | | 100 | | | | | | |
| Geon #22 | | | | | | 100 | | | | | |
| Geon #25 | | | | | | | 100 | | | | |
| Geon #27 | | | | | | | | 100 | | | |
| Kaneka PSL-31 | | | | | | | | | 100 | | |
| Sumilit PX-NL | | | | | | | | | | 100 | |
| Hüles #7012 | | | | | | | | | | | 100 |
| Plasticizer DOP | 70 | 70 | 70 | 70 | 70 | 70 | 70 | 70 | 70 | 70 | 70 |
| Blowing agent azodicarbonamide | 6 | 6 | 6 | 6 | 6 | 6 | 6 | 6 | 6 | 6 | 6 |
| Stabilizer Mark FL-23 | 4 | 4 | 4 | 4 | 4 | 4 | 4 | 4 | 4 | 4 | 5 |
| Properties | | | | | | | | | | | |
| Breathability* (cc/cm$^2$/sec) | nil | nil | nil | nil | nil | 6 | 4 | 8 | 3 | nil | 4 |
| Water permeability** (sec) | nil | nil | nil | nil | nil | 13 | 23 | 12 | 25 | nil | 25 |

TABLE 1b

| Examples | 12 | 13 | 14 | 15 | 16 | 17 | 18 | 19 | 20 | 21 | 22 |
|---|---|---|---|---|---|---|---|---|---|---|---|
| Ingredients | | | | | | | | | | | |
| Plastisol PVC | | | | | | | | | | | |
| Geon #121 | 100 | | | | | | | | | | |
| Geon #135J | | 100 | | | | | | | | | |
| Geon #131A | | | 100 | | | | | | | | |
| Geon TS-12 | | | | 100 | | | | | | | |
| Geon 43B | | | | | 100 | | | | | | |
| Geon #22 | | | | | | 100 | | | | | |
| Geon #25 | | | | | | | 100 | | | | |
| Geon #27 | | | | | | | | 100 | | | |
| Kaneka PSL-31 | | | | | | | | | 100 | | |
| Sumilit PX-NL | | | | | | | | | | 100 | |
| Hüles #7012 | | | | | | | | | | | 100 |
| Plasticizer DOP | 70 | 70 | 70 | 70 | 70 | 70 | 70 | 70 | 70 | 70 | 70 |
| Blowing agent azodicarbonamide | 6 | 6 | 6 | 6 | 6 | 6 | 6 | 6 | 6 | 6 | 6 |
| Stabilizer Mark FL-22 | 4 | 4 | 4 | 4 | 4 | 4 | 4 | 4 | 4 | 4 | 4 |
| Properties | | | | | | | | | | | |
| Breathability* | nil | nil | nil | nil | nil | 8 | 2 | 10 | 3 | nil | 5 |

TABLE 1b-continued

| Examples | 12 | 13 | 14 | 15 | 16 | 17 | 18 | 19 | 20 | 21 | 22 |
|---|---|---|---|---|---|---|---|---|---|---|---|
| (cc/cm$^2$/sec) | | | | | | | | | | | |
| Water permeability** (sec) | nil | nil | nil | nil | nil | 14 | 28 | 9 | 31 | nil | 30 |

Notes to Table 1a and 1b
*Breathability test in accordance with the automotive industry standards.
**The time required for about 1 cc of colored water dropped on the foam sheet to permeate to the back side. For specimens having no permeability, waterdrops on the surface are blotted by a piece of filter paper one minute later and traces of water are checked. The colored water is prepared by diluting 10 cc of blue ink (Pilot Ink Co., Ltd.) with 100 cc of distilled water.

TABLE 2

| Examples | 23 | 24 | 25 | 26 | 27 | 28 | 29 |
|---|---|---|---|---|---|---|---|
| Ingredients | | | | | | | |
| Plastisol PVC | | | | | | | |
| Geon #27 | 100 | 100 | 100 | 100 | 100 | 100 | 100 |
| Stabilizers | | | | | | | |
| KF-65E-6 | 4 | | | | | | |
| KF-80A-8 | | 4 | | | | | |
| Stabilizer F | | | 4 | | | | |
| Sodium octoate | | | | 1.0 | | 1.0 | |
| Potassium octoate | | | | | 1.0 | | 1.0 |
| Zinc octoate | | | | 2.5 | 2.5 | 1.5 | 1.5 |
| Calcium octoate | | | | | | 1.0 | 1.0 |
| Plasticizer DOP | 60 | 60 | 60 | 60 | 60 | 60 | 60 |
| Blowing agent azodicarbonamide | 5 | 5 | 5 | 5 | 5 | 5 | 5 |
| Slip agent stearic acid | 0.3 | 0.3 | 0.3 | 0.3 | 0.3 | 0.3 | 0.3 |
| Properties | | | | | | | |
| Breathability (cc/cm$^2$/sec) | 7 | 9 | 9 | 8 | 10 | 6 | 9 |
| Water permeability (sec) | 14 | 15 | 21 | 13 | 14 | 10 | 12 |

What is claimed is:

1. A process for producing an open-cell foam sheet, said process comprising the steps of:
   (a) mixing a polyvinyl chloride plastisol; at least one stabilizer containing a Group I metal selected from the group consisting of sodium, potassium, lithium, or mixtures thereof and further comprising zinc; and a blowing agent to form a blend;
   (b) mixing said blend at a temperature greater than ambient but lower than gelling temperature to convert said blend to a granular state;
   (c) intensively mixing the product of step (b) at gelling temperature to form a gel;
   (d) forming the gelled blend of step (c) into a sheet; and
   (e) heating said sheet to decompose said blowing agent, thereby forming said open-cell foam.

2. The process as defined by claim 1 comprising gelling the blend of step (a) by heating while milling said blend of step (a).

3. The process as defined by claim 1 wherein the polyvinyl chloride of said plastisol is selected from the group consisting of: polyvinyl chloride homopolymer, polyvinyl chloride copolymer, polyvinyl chloride homopolymer blended with copolymer, and combinations thereof.

4. The process as defined by claim 3 wherein said polyvinyl chloride copolymer is a member selected from the group consisting of vinyl chloride-acetate copolymer, vinyl chloride-ethylene copolymer, vinyl chloride-maleic acid copolymer, and mixtures thereof.

5. The process as defined by claim 3 wherein said polyvinyl chloride plastisol consists essentially of polyvinyl chloride homopolymer.

6. The process as defined by claim 3 wherein said polyvinyl chloride homopolymer is blended with a copolymer selected from the group consisting of polymethyl methacrylate, ethylene-vinyl acetate copolymer, acrylonitrile-butadiene rubber and mixtures thereof.

7. The process as defined by claim 1 wherein said stabilizer further comprises zinc in combination with calcium.

8. The process as defined by claim 1 wherein the only non-Group I metal present is zinc.

9. The process as defined by claim 1 wherein said blend comprises two distinct stabilizers added separately to said blend.

10. The process as defined by claim 1 wherein said blend comprises two stabilizers added as a composite.

11. The method as defined by claim 1 wherein said blowing agent is azodicarbonamide.

12. The method as defined by claim 1 comprising applying said sheet onto a substrate by extrusion or calendering.

13. A process for producing granules or powder used to form an open cell foam, said process comprising the steps of:
   (a) mixing a polyvinyl chloride plastisol, at least one stabilizer containing a Group I metal selected from the group consising of sodium, potassium, lithium, or mixtures thereof and further comprising zinc, and a foaming agent to form a blend in the form of a paste; and
   (b) converting said paste into said granules or powder by mixing said blend at a temperature of about 100° to 120° C.

14. A process for producing an open-cell foam, said process comprising the steps of:
   (a) mixing a polyvinyl chloride plastisol, and at least one stabilizer containing a Group I element selected from the group consisting of: sodium, potassium, lithium, or mixtures thereof, in combination with zinc, and a blowing agent to form a blend;
   (b) mixing said blend at a temperature greater than ambient but lower than gelling temperature to convert said blend to a granular state;
   (c) intensively mixing the product of step (b) at gelling temperature to form a gel;
   (d) forming the gell of step (c); and
   (e) heating said formed gel of step (d) to decompose said blowing agent, thereby forming said open-cell foam.

15. The process as defined by claim 14 wherein said stabilizer further comprises calcium in combination with said zinc.

16. The process as defined by any one of claims 1, 13, or 26 comprising a stabilizer selected from the group consisting of sodium octoate, potassium octoate, sodium stearate, potassium stearate, zinc stearate, calcium stearate, and mixtures thereof.

17. A granular or powdered blend, as defined by claim 20, comprising a stabilizer selected from the group consisting of sodium octoate, potassium octoate, sodium stearate, potassium stearate, zinc stearate, calcium stearate, and mixtures thereof.

18. The process as defined in claim 1 wherein step (b) is performed at a temperature between 100° C. and 120° C., and step (c) is performed at a temperature of 130° C. to 155° C.

19. The process according to claim 14 wherein step (b) is performed at a temperature between 100° C. and 120° C., and step (c) is performed at a temperature of 130° C. to 155° C.

20. A granular or powder blend for forming an open cell foam, said blend being formed of polyvinyl chloride plastisol, at least one stabilizer containing a Group I metal selected from the group consisting of sodium, potassium, lithium, or mixtures thereof and further comprising zinc, and a foaming agent.

21. The sheet formed by the process of any one of claims 1, 2, 3–6, 7, 8, or 9–12.

22. The sheet formed by the process of claim 1.

* * * * *